United States Patent
Ganley

(10) Patent No.: US 10,352,233 B2
(45) Date of Patent: Jul. 16, 2019

(54) HIGH-EFFICIENCY TWO-STROKE INTERNAL COMBUSTION ENGINE

(71) Applicant: James T Ganley, St. Paul, MO (US)

(72) Inventor: James T Ganley, St. Paul, MO (US)

(73) Assignee: James T. Ganley, St. Paul, MO (US)

( * ) Notice: Subject to any disclaimer, the term of this patent is extended or adjusted under 35 U.S.C. 154(b) by 121 days.

(21) Appl. No.: 15/702,597

(22) Filed: Sep. 12, 2017

(65) Prior Publication Data
US 2019/0078510 A1   Mar. 14, 2019

(51) Int. Cl.
| | |
|---|---|
| F02B 75/02 | (2006.01) |
| F02B 41/00 | (2006.01) |
| F02D 41/00 | (2006.01) |
| F02D 41/38 | (2006.01) |
| F02M 21/02 | (2006.01) |
| F02D 19/02 | (2006.01) |
| F02B 1/10 | (2006.01) |

(52) U.S. Cl.
CPC ............. *F02B 41/00* (2013.01); *F02B 1/10* (2013.01); *F02B 75/02* (2013.01); *F02D 19/021* (2013.01); *F02D 41/0002* (2013.01); *F02D 41/0027* (2013.01); *F02D 41/38* (2013.01); *F02M 21/0206* (2013.01); *F02B 2075/025* (2013.01); *F02D 2041/389* (2013.01); *F02D 2400/04* (2013.01)

(58) Field of Classification Search
CPC .... F02B 41/00; F02B 2075/025; F02D 41/38; F02D 2041/289; F02D 41/0027
USPC ........................................................ 123/65 R
See application file for complete search history.

(56) References Cited

U.S. PATENT DOCUMENTS

| | | | | |
|---|---|---|---|---|
| 367,496 | A |  | 8/1887 | Atkinson |
| 1,911,874 | A | * | 5/1933 | Barkeij ............... F16F 15/24 |
| | | | | 123/54.6 |
| 2,769,435 | A | * | 11/1956 | Cass ................... F02B 1/00 |
| | | | | 123/26 |
| 2,817,322 | A | * | 12/1957 | Miller ............ F01L 13/0005 |
| | | | | 123/316 |
| 5,195,486 | A | * | 3/1993 | Ishii .................. F02B 19/04 |
| | | | | 123/257 |
| 2005/0241612 | A1 | * | 11/2005 | Ward .................. F02B 23/08 |
| | | | | 123/301 |
| 2006/0243241 | A1 | * | 11/2006 | Kuo .................... F01L 13/00 |
| | | | | 123/295 |
| 2007/0245982 | A1 | * | 10/2007 | Sturman ............. F02B 21/00 |
| | | | | 123/26 |
| 2012/0090580 | A1 | * | 4/2012 | Hu ..................... F02B 25/04 |
| | | | | 123/564 |

OTHER PUBLICATIONS

Albert Boretti, Azmi Osman, Ishak Aris; Direct Injection of Hydrogen, Oxygen, and Water in a Novel Two Stroke Engine; International Journal of Hydrogen Energy; vol. 36; 2011; pp. 10100 to 10106.
Azmi Osman; Feasibility Study of a Novel Combustion Cycle Involving Oxygen and Water; 2009 SAE Powertrains, Fuels, and Lubricants Meeting: Paper No. 2009-01-2808; Published Nov. 2, 2009.

* cited by examiner

*Primary Examiner* — Marguerite J Mcmahon

(57) ABSTRACT

A two-stroke internal combustion engine achieves high performance levels by using an innovatively timed sequence of injecting and igniting fuel and oxidant. The operating cycle of the engine does not utilize a compression process. This permits the injection of fuel and oxidant to be coordinated with the initiation of the combustion process in such a way that the engine achieves high efficiency and provides high torque, while at the same time producing low thermal loading of engine components and low levels of engine noise and vibration.

10 Claims, 4 Drawing Sheets

HIGH-EFFICIENCY TWO-STROKE INTERNAL COMBUSTION ENGINE

BACKGROUND OF THE INVENTION

This invention relates generally to a two-stoke internal combustion engine which does not have a compression process as part of its operating cycle; more specifically, this invention relates to an engine which uses an innovatively timed sequence of injecting and igniting fuel and oxidant to achieve high operating efficiency, high torque values, and low thermal loading for engine components. The engine will operate efficiently with a number of different fuel/oxidant combinations and it can be utilized in both stationary and mobile applications.

Some of the more important applications for the engine described in this specification exist in the renewable energy field. During the past few decades, there have been important advances in technologies for cost-effectively converting various types of renewable energy (solar, wind, tidal, etc.) into the kinds of energy required by modern societies. In spite of these advances, utilization of renewable resources is still very limited. This is primarily because of strong hourly, daily, and seasonal variations in the availability of most types of renewable energy. Modern societies require steady, uninterrupted supplies of energy, but energy from renewable sources is not always available when needed. Clearly, efficient energy storage and reconversion technologies must be developed if renewable energy is to become a significant factor in meeting global energy needs.

Intermittent availability is especially problematic for the electricity generated from renewable resources. This is because technologies for direct storage of electrical energy (capacitors, super-conducting inductors, batteries, etc.) cannot be economically scaled to meet the demands of large energy markets. In addition, previously proposed technologies for indirect storage of electricity (technologies that transform electricity into more easily stored energy forms) have been shown to be inefficient and expensive, and in some cases, applicable only in very specific geographic locations.

Among the more thoroughly studied indirect approaches for storing and subsequently utilizing electricity are technologies that are commonly referred to as electrolysis-storage-reconversion (ESR) processes. Basically, these processes consist of three main steps: (1) electrolysis of a chemical compound to produce chemical energy in the form of a combustible fuel, (2) combustion of the fuel in a heat engine to produce mechanical energy, and (3) utilization of the mechanical energy to perform a desired task, such as driving an electrical generator or powering a transportation vehicle. A specific example of this general procedure is the basis for what is sometimes referred to as the hydrogen economy, with the electrolyzed chemical compound being water, the combustible fuel being hydrogen, and the heat engine being some sort of internal combustion engine. The greatest barrier to implementing the hydrogen economy on a global scale is the overall inefficiency of previously proposed ESR processes—and the greatest energy losses for these ESR processes occur in the heat engines used in the reconversion step.

The primary objective of this invention is to offer a low-cost, high-performance internal combustion engine that uses fuel—and possibly oxidant—that is generated by an electrolysis process. The innovative thermodynamic cycle by which the presently proposed engine operates can be carried out with any one of a number of different fuel/oxidant combinations. However, the embodiment of the present invention which is anticipated to give optimal performance is an engine which uses high-pressure hydrogen gas as the fuel and high-pressure oxygen gas as the oxidant, both of which can be provided by the electrolysis of water. Thus, the engine disclosed herein offers technology improvements that make an important ESR process less costly and more efficient. This engine, when coupled with existing high-efficiency electrolysis techniques and newly-developed gas storage capabilities, will transform renewable energy resources into reliable and economically practicable energy supplies that are capable of meeting the demands of large and small energy markets all over the world.

BRIEF DESCRIPTION OF THE INVENTION

All internal combustion engines that have been brought into service during the past 150 years or so have had operating cycles that include a compression process. Compression of a gaseous oxidant or a gaseous fuel/oxidant mixture prior to combustion provides a capability for large volumetric expansion ratios for the combustion products—and larger expansion ratios are directly associated with more efficient engines. However, the compression process—as it is performed in existing internal combustion engines—imposes severe mechanical and thermal design constraints on engine components. For example, in conventional reciprocating piston engines, expansion of combustion products occurs within the same physical volume as compression of the oxidant or the fuel/oxidant mixture. In these engines, the expansion ratio of the combustion products is constrained to be equal to, or very nearly equal to, the compression ratio of the oxidant or the fuel/oxidant mixture. Attempts to achieve higher compression ratios—and correspondingly higher efficiencies—require heavier engine components made of materials capable of withstanding very high temperatures. Ultimately, these design constraints limit the compression and expansion ratios which can be practicably achieved, and this, in turn, limits the theoretically achievable efficiency of engines utilizing a compression process.

The present invention reveals a two-stroke internal combustion engine which does not utilize a compression process as part of its operating cycle. For the engine revealed herein, the desired compression of an oxidant or of a fuel/oxidant mixture is done by equipment that is not involved with the engine's operating cycle. The compression can be done by equipment that is remote from the engine's operating platform or by auxiliary equipment driven by the engine itself. In either case, operation of the presently proposed engine relies on a supply of high-pressure fuel and/or oxidant that is delivered from external reservoirs. (It should be noted that, because of their low volumetric energy densities, hydrogen and oxygen are normally stored at high pressure. This means that no additional expenditures of energy are required in order to supply these gasses to an engine at high pressure.)

Since the engine revealed in this specification has no compression process in its operating cycle, the design and mechanical interconnections of the engine's components can be optimized to provide a high expansion ratio for the combustion products, thus creating the capability for high operating efficiency. Additional desirable performance features of the presently revealed engine include high torque values, low thermal loading for engine components, and low vibration and noise levels. Also, the engine's design permits recovery of a significant portion of the fuel/oxidant compression energy and it converts that recovered energy into useful work.

As mentioned earlier, the preferred embodiment of this invention is an engine that uses high-pressure hydrogen gas as its fuel and high-pressure oxygen gas as its oxidant. In an attempt to offer a clearer exposition of this invention, all of the following discussions will be in terms of an engine which is continuously provided with appropriate quantities of high-pressure gaseous fuel and high-pressure gaseous oxidant, even though it is to be understood that some types of liquid fuels may be used without seriously impacting engine performance.

The disclosed engine is a two-stroke reciprocating piston engine, with the two strokes being (1) a power stroke, wherein the engine performs useful work, and (2) an exhaust stroke, wherein the engine expels combustion products. The engine has a multiplicity of hollow circular cylinders, each with one immovable closed end. The engine also has a multiplicity of pistons, each of which moves in a reciprocating fashion within an associated cylinder. Each piston is individually linked by a connecting rod to one of the crank arms of a crankshaft. The function of the crankshaft is to convert the reciprocating motion of the pistons into rotational motion. For the engine revealed herein, as in all two-stroke internal combustion engines, each 360 degree rotation of the crankshaft is accompanied by one power stroke for each of the engine's pistons.

When the presently proposed engine is operating, fuel and oxidant are introduced at high pressure into each of the engine's cylinders during the initial portion of the engine's power strokes. Later in the power strokes, an electric spark ignites the fuel/oxidant mixture and the subsequent expansion of hot combustion products drives the pistons. The pistons, in turn, force the rotation of the crankshaft.

For the two-stroke engine revealed herein, each piston completes a power stroke every time it reaches its bottom-dead-center position. (The bottom-dead-center position of a piston corresponds to the maximum internal volume of the piston's associated cylinder.) As a piston is approaching its bottom-dead-center position, its associated cylinder contains relatively low-pressure combustion products which have undergone expansion-induced cooling during the preceding power stroke. As the piston approaches this position, an exhaust valve in the closed end of the cylinder opens and the pressure inside the cylinder drops rapidly. The opening of the exhaust valve marks the beginning of the piston's exhaust stroke. The piston then moves upward towards its top-dead-center position (position of minimum internal volume for the associated cylinder). This movement expels the combustion products from the cylinder and drives them into an exhaust manifold. It should be noted that the piston does negligible work during this exhaust stroke because the pressure inside the cylinder is never appreciably above atmospheric pressure.

An important design feature of the presently disclosed engine is that the internal volume of each cylinder is extremely small when its associated piston is at its top-dead-center position. The mechanical design of the engine is such that, when the piston reaches its top-dead-center position, the front surface of the piston engages the closed end of the cylinder as closely as fabrication techniques and normal mechanical tolerances will allow, without the piston actually making contact with the cylinder's closed end. The small internal volume of the cylinder at this point assures that essentially all of the combustion products have been forced into the exhaust manifold. When the piston reaches its top-dead-center position, the exhaust valve closes. This marks the termination of the exhaust stroke and the beginning of the power stroke.

As soon as the exhaust valve has completely closed, oxidant and fuel inlet valves (also located in the closed end of the cylinder) open. As these valves open, an overpressure (pressure above atmospheric) is created within the cylinder by the entry of high-pressure fuel and oxidant gasses. Since the internal volume of the cylinder is increasing at this point, the overpressure does useful work by driving the piston away from its top-dead-center position. This gas-expansion work is a recovery of a portion of the compression energy originally used to pressurize the fuel/oxidant gasses. It should be noted that the high-pressure fuel and oxidant gasses exert steady, relatively low-magnitude forces (soft forces) on the piston as they enter the cylinder, and the resulting engine vibrations are negligible. (In conventional engines that utilize a compression process, combustion is initiated when the piston is at or near its top-dead-center position and this produces sudden, high-amplitude forces on the slowly moving piston, thus creating significant noise and engine vibration.) Also, for the engine revealed in this specification, the fuel and oxidant gasses are at a relatively low temperature when they enter the cylinder. These gasses not only perform useful work as they enter the cylinder, they also remove heat from the piston and the upper (warmest) part of the cylinder wall. (In conventional engines that use a compression process, the gasses in the cylinder are very hot before they are ignited. After ignition, the resulting combustion products in these conventional engines produce a high thermal loading of engine components—a thermal loading much greater than that which is produced by combustion of the relatively cool fuel/oxidant gasses in the presently proposed engine.) Finally, and most importantly, it should be noted that, for the engine disclosed herein, when fuel and oxidant are injected into a cylinder in the manner described above, it is possible to produce any desired conditions of pressure and specific volume for the fuel and oxidant gasses, even conditions which are practicably unachievable by means of compression processes that are normally carried out prior to combustion in conventional engines. This means that, in the presently revealed engine, the expansion ratio for the combustion products—and the corresponding achievable engine efficiency—can be selected independently of other engine design concerns.

For the engine revealed herein, fuel and oxidant gasses introduced into a cylinder perform useful work as they drive the piston away from its top-dead-center position. After the required quantities of fuel and oxidant have been introduced to a cylinder, the inlet valves close and the fuel and oxidant gasses continue to expand and continue to do useful work. Then, when a specific, predetermined internal volume of the cylinder is reached, an electric spark initiates the combustion process. The internal volume of the cylinder at which ignition occurs corresponds to a specific crankshaft orientation relative to its orientation at the top-dead-center position for a particular piston. The orientation of the crankshaft at which ignition occurs within a particular cylinder, referenced to zero degrees for the crankshaft orientation which produces the top-dead-center position for that cylinder's associated piston, is referred to herein as the crank ignition angle. (The crank ignition angle is the same for each cylinder, even though the physical orientation of the crankshaft is different for ignition in different cylinders.) After ignition occurs within a cylinder, expansion of the hot combustion products drives the associated piston towards its bottom-dead-center position. The power stroke ends as the piston approaches its bottom-dead-center position; then the exhaust valve opens and the cycle begins again.

From the above discussion it is apparent that, for the engine revealed in this specification, the power stroke consists of two parts: (1) a pre-ignition part wherein the piston is driven away from its top-dead-center position by the overpressure of incoming fuel and oxidant gasses, and (2) a post-ignition part wherein the piston is driven to its bottom-dead-center position by expanding combustion products. The efficiency of the engine is determined from the useful work done by the engine during both parts of the power stroke. The engine revealed herein utilizes both the compression energy and the chemical energy stored in the fuel/oxidant gasses.

Regarding the presently proposed engine, it must be emphasized that, once certain geometrical properties (mechanical dimensions) of the engine's components have been selected to optimize other design considerations, the expansion ratio of the combustion products—as well as the engine's achievable efficiency—is determined solely by selection of the crank ignition angle. This is an important design capability for the presently revealed engine that is not available in conventional engines utilizing a compression process. For engines utilizing a compression process, the compression ratio and the corresponding expansion ratio are limited by the engine's ability to withstand the high pressures and high temperatures produced by the compression process. Since the presently revealed engine does not utilize a compression process, those design limitations are removed. The engine revealed herein can achieve very high expansion ratios without creating excessive mechanical or thermal stresses on engine components.

A few examples illustrate the advantages offered by the engine revealed in this specification. For this engine, if the ratio of the connecting rod length to the crank arm length is 3—as in smaller engines—and the crank ignition angle is 15 degrees, then the expansion ratio for the combustion products is 44:1. If the ratio of connecting rod length to crank arm length is 6—as in larger engines—and the crank ignition angle is 15 degrees, then the expansion ratio is 50:1. (These calculations are based on the assumption that, at the top-dead-center position of a piston, the internal volume of the associated cylinder is insignificant relative to its internal volume at ignition.) The ratios above should be compared with typical compression and expansion ratios of high-performance diesel engines, which are generally in a range of roughly 17:1 to 22:1. Clearly, higher expansion ratios and correspondingly higher efficiencies are achievable with the presently revealed engine. Also, it should be noted that, in order to provide a compression/expansion ratio of 50:1, a conventional diesel engine would create a pre-combustion pressure within the cylinders of more than 3500 pounds per square inch and the pre-combustion temperature would be more than 1100 degrees Celsius. With quantities of fuel and oxidant that are equivalent to the previous example, achieving an expansion ration of 50:1 in a hydrogen/oxygen engine of the type revealed herein would require pre-combustion pressure and temperature of roughly 450 pounds per square inch and 30 degrees Celsius, respectively. It can be seen that the engine revealed herein operates at much lower pressures and temperatures than a conventional engine that utilizes a compression process. Finally, it should be noted that, when the fuel/oxidant ignition event is delayed relative to the top-dead-center position of the piston by a crankshaft rotation of several degrees—as it is for the engine revealed herein—significantly higher torque values are produced than in conventional engines that use a compression process.

In summary, the two-stroke internal combustion engine revealed herein has innovative design features which translate into important performance capabilities. The presently revealed engine does not utilize a compression process as part of its operating cycle. Instead, as the engine operates, it is supplied with high-pressure fuel and oxidant gasses that are provided from external reservoirs. The engine is designed so that the internal volume of the cylinders is very small when the associated pistons are at their top-dead-center positions. The result of this design choice is that the expansion ratio of the engine's combustion products can be set to a very high value by choosing an appropriate crank ignition angle. Reasonable choices for the crank ignition angle provide high efficiency, high torque, low thermal loading of critical engine components, and low noise and vibration levels.

DETAILED DISCUSSION OF THE INVENTION

Figure 1:
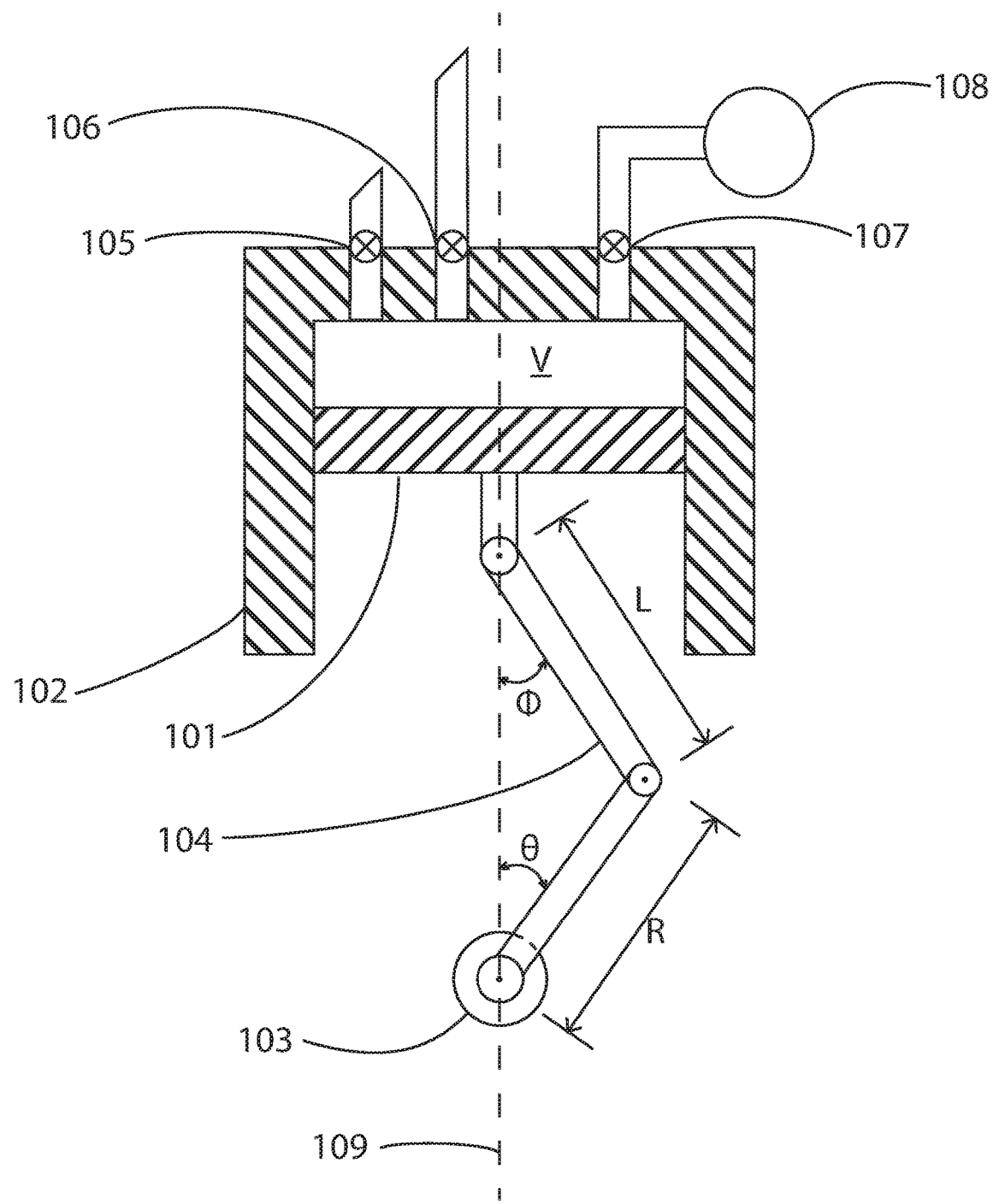
FIG. 1 shows a piston situated coaxially within a cylinder, with the piston linked to a crankshaft by a connecting rod.

This specification uses terms which have a technical meaning that may differ from the meaning assumed in everyday usage. The following paragraphs contain definitions and explanations of various terms and concepts with regard to the meaning intended herein.

The term "cylinder" is used herein to refer to a hollow circular cylinder having a central longitudinal axis of symmetry, and also having one open end and one closed end which is immovable, and also having inlet and exhaust ports in its closed end. The engine disclosed herein has a multiplicity of such cylinders which serve as combustion chambers for fuel and oxidant gasses. The term "valve" is used herein to refer to a mechanical or electro-mechanical device which controls the flow of gasses through an inlet or an exhaust port. Inlet valves control the flow of fuel and oxidant passing into a cylinder and exhaust valves control the flow of combustion products passing into an exhaust manifold. It is to be understood that modern engine valves may have multiple orifices that open and close in different combinations to accurately regulate gas flows.

The term "piston" is used herein to refer to one of a multiplicity of circularly cylindrical objects, each of which is coaxially situated within one of the aforementioned cylinders. Each piston is constrained to move in a reciprocating fashion within its associated cylinder and as it moves, a piston provides a movable closed end for its associated cylinder. The term "front surface" is used herein to refer to the surface of a piston which faces towards, and is closest to, the immovable closed end of said piston's associated cylinder. The term "back surface" is used herein to refer to the surface of a piston which faces away from, and is farthest from, the immovable closed end of said piston's associated cylinder.

The terms "internal volume" and "internal volume of a cylinder" are used interchangeably herein to refer to the volume which is enclosed by the following three surfaces: the inner surface of the closed end of a cylinder, the inner surface of the circular wall of that same cylinder, and the front surface of the associated piston. The internal volume of a cylinder varies continuously and cyclically from a maximum value to a minimum value and then back to a maximum value as its associated piston executes its reciprocating motion. The time-varying internal volume of a cylinder is represented herein by the symbol "V."

The term "wrist pin joint" is used herein to designate a smoothly rotating joint which is attached, either directly or indirectly, to the back surface of a piston for the purpose of joining one end of a connecting rod (explained later) to said piston. The term "crank pin joint" is used herein to refer to a smoothly rotating joint which joins one end of a connecting rod to a crankshaft (explained in the following paragraph).

The term "crankshaft" is used herein to designate an elongated shaft which is free to rotate about its central longitudinal axis. A crankshaft has a multiplicity of crank arms (one for each cylinder/piston assembly), with each crank arm having a crank pin joint that allows for the eccentric attachment of a connecting rod to the crankshaft.

The term "connecting rod" is used herein to designate a rigid mechanical member which is attached at one end to a piston's wrist pin joint, and is attached at the other end to the crank pin joint of one of the crank arms on the crankshaft. A connecting rod provides an eccentric mechanical linkage between a piston and the crankshaft. A connecting rod provides a means of transferring forces from a piston to the crankshaft and vice versa.

The terms "useful work" and "useful work done by an engine" are used interchangeably herein to refer to the work done by forces transferred from a piston to the crankshaft while the internal volume of the piston's associated cylinder is increasing. The terms "internal work" and "internal work done by an engine" are used interchangeably herein to refer to the work done by forces transferred from the crankshaft to a piston while the internal volume of the piston's associated cylinder is decreasing. The term "net useful work" is used herein to refer to the difference between the useful work done by an engine and the internal work done by that same engine. The term "load" is used herein to refer to the amount of net useful work which an engine must do to accomplish a specific task. An engine responds to an increased or decreased load by allowing a greater or lesser amount of fuel and oxidant into its cylinders. The amount of fuel and oxidant required to accomplish a specific amount of net useful work is referred to herein as a "load-specific" quantity of fuel and oxidant.

The term "operating cycle" is used herein to designate an ordered sequence of thermodynamic processes which occur repetitively within an engine. For reciprocating internal combustion engines in general, and for the presently proposed engine in particular, the operating cycle is carried out repetitively within each of the engine's individual cylinders.

In this specification, combustion processes and compression processes are of importance in discussing operating cycles. The term "combustion process" is used herein to refer to the chemical reaction of a fuel with an oxidant, with the reaction producing heat and new chemical compounds (combustion products). All internal combustion engines, by definition, utilize a combustion process. In general, the term "compression process" refers to the mechanical application of force to a confined fluid, with a resultant increase in pressure and a decrease in the volume of the confined fluid. The term "compression energy" is used herein to refer to the energy used to carry out a compression process. In this specification, when discussing engine operating cycles, the term "compression process" refers to the application of force exerted by a piston on fuel and/or oxidant gasses that are confined within a cylinder, with a resultant increase in the pressure and a decrease in the volume of the confined gasses. The compression processes referred to herein are approximately adiabatic, so there is also an increase in temperature of the confined gasses as the compression process is carried out. For an internal combustion engine, internal work is done by the engine during a compression process. All internal combustion engines currently in service do a significant amount of internal work because their operating cycles include a compression process.

This invention reveals a high-efficiency two-stroke internal combustion engine whose operating cycle does not include a compression process. Instead, the engine operates with supplies of high pressure fuel and oxidant gasses that are provided from external reservoirs. The engine revealed herein efficiently converts a portion of the compression energy of high-pressure fuel and oxidant gasses, as well a portion of their chemical energy, into useful work.

The disclosed engine is comprised of a multiplicity of cylinders, each with an associated piston which is constrained to move in a reciprocating fashion within its associated cylinder. Each cylinder has, in its closed end, inlet valves which regulate the flow of fuel and oxidant gasses coming into the cylinder and an exhaust valve which regulates the flow of combustion products passing out of the cylinder and into an exhaust manifold.

Each of the engine's pistons is joined to a common crankshaft by a connecting rod. It should be noted that the angular orientation of the crankshaft continuously determines position of each piston within its associated cylinder. The crankshaft converts the reciprocating motion of the pistons into circular motion by means of the eccentric attachment of the connecting rods to the crankshaft. The length of each of the engine's connecting rods, as measured between the centers of its wrist pin joint and its crank pin joint attachments, is the same. That common length is designated herein by the symbol "L." Also, the length of each of the crankshaft's crank arms, as measured between center of its crank pin joint and the crankshaft's central longitudinal axis, is the same. That common length is designated herein by the symbol "R." The stroke length of any piston (one-way extent of the piston's reciprocating movement) is equal to 2R. The ratio of L to R is referred to herein as the "rod ratio" of the engine. It is designated herein by the symbol "$\Omega$." The rod ratio is an important parameter in determining the amount of friction-induced wear of pistons and/or crosshead bearings. As will be seen later, the value of the rod ratio also affects the expansion ratio of combustion products and thus the achievable efficiency of an engine.

For the purposes of this document, the term "top-dead-center" refers to the position of a piston which minimizes the internal volume of its associated cylinder. The internal volume of the cylinder at the top-dead-center position of the piston is designated herein by the symbol "$V_T$." For the presently revealed engine, $V_T$ is, by design, very close to zero.

For the purposes of this document, the term "bottom-dead-center" refers to the position of a piston which maximizes the internal volume of its associated cylinder. The internal volume of the cylinder at the bottom-dead-center position of the piston is designated herein by the symbol "$V_B$." In general, $V_B$ is equal to $V_T$ plus the product of the cross-sectional area of the cylinder and 2R. For the engine revealed herein, since $V_T$ is approximately zero, $V_B$ is just equal to the product of the cross-sectional area of the cylinder and 2R.

The term "crank angle," represented herein by the symbol "θ," is used to designate the angle between a crank arm of the crankshaft and the axis of the associated cylinder/piston assembly, with θ being referenced to zero when the piston is at its top-dead-center position. (It should be noted that, even though all of the pistons move together in a temporally synchronized manner, they do not all achieve a top-dead-center position simultaneously. Therefore, for any given physical orientation of the crankshaft, the value of θ is different for each individual piston, and is just equal to the angle through which the crankshaft has rotated since that particular piston was at its top-dead-center position.) The term "rod angle," designated herein by the symbol "φ," is used to designate the angle between a connecting rod and the axis of its associated piston/cylinder assembly, with φ referenced to zero degrees when the piston is at its top-dead-center position. The instantaneous torque provided by a piston is proportional to the sine of the sum of θ and φ. In particular, very little torque is provided by a piston acting on the crankshaft when said piston is near its top-dead-center position, that is, when both θ and φ are close to zero.

The term "power stroke" is used herein to designate the movement of a piston from its top-dead-center position to its bottom-dead-center position. During a piston's power stroke, the crankshaft rotates through an angle of 180 degrees, that is, from θ=0 degrees to θ=180 degrees for a particular piston. Similarly, the term "exhaust stroke" is used herein to refer to the movement of a piston from its bottom-dead-center position to its top-dead-center position. During a piston's exhaust stroke, the crankshaft rotates through an angle of 180 degrees, that is, from θ=180 degrees to θ=360 degrees for that particular piston. (The crankshaft orientation corresponding to θ=360 degrees for a particular piston is identical to the orientation designated as θ=0 degrees for that same piston.)

FIG. 1 is a line drawing which illustrates the interconnection of the engine components discussed in the previous paragraphs. FIG. 1 shows piston 101 positioned coaxially within cylinder 102. Piston 101 is joined to the crank arm of crankshaft 103 by connecting rod 104. FIG. 1 also shows the length L of the connecting rod, the length R of the crankshaft's crank arm, the measure of crank angle θ, the measure of rod angle φ, and the internal volume of the cylinder, V. In addition, FIG. 1 shows high-pressure fuel inlet valve 105, high-pressure oxidant inlet valve 106, exhaust valve 107 and exhaust manifold 108. The crank angle θ and the rod angle φ are both referenced to zero degrees when the piston is at its top-dead-center position, that is, when the connecting rod and the crank arm are aligned with the central longitudinal axis of the cylinder/piston assembly, which is designated by dotted line 109 in FIG. 1.

The operating cycle of the presently revealed engine is now described in terms of the operation of a single cylinder/piston assembly. The starting point of the cycle is chosen as the time at which the piston approaches its bottom-dead-center position. At this point, the piston has just completed a power stroke and the cylinder contains expansion-cooled combustion products at relatively low pressure. As the piston approaches its bottom-dead-center position, the exhaust valve in the closed end of the associated cylinder opens and the pressure in the cylinder drops rapidly to near atmospheric pressure. The subsequent motion of the piston towards its top-dead-center position (exhaust stroke) forces the combustion products out of the cylinder and into the exhaust manifold. As was mentioned earlier, an important feature of this engine's design is that the internal volume of the cylinder is vanishingly small when the piston is at its top-dead-center position. This assures that, when the piston reaches its top-dead-center position, all of the combustion products have been expelled from the cylinder. When the piston reaches its top-dead-center position, the exhaust valve closes and the exhaust stroke is complete. It should be noted that, for the engine disclosed herein, negligible internal work is done by the engine during the exhaust stroke.

After the exhaust valve is completely closed, the oxidant and fuel inlet valves open, creating an overpressure (pressure above atmospheric pressure) in the cylinder. This marks the beginning of the engine's power stroke. Forces produced by the overpressure drive the piston away from its top-dead-center position and a portion of the compression energy of the incoming high-pressure fuel and oxidant gasses is converted to useful work. After the required load-specific quantities of fuel and oxidant have entered the cylinder, the inlet valves close. The high-pressure gasses in the cylinder continue to expand and continue to do useful work until the crankshaft reaches a specific, predetermined crank angle at which ignition of the fuel/oxidant mix is initiated by an electric spark. The term "crank ignition angle," represented by the symbol "$θ_1$," is used herein to refer to the crank angle at which ignition occurs. The internal volume of the cylinder at the time of ignition is referred to herein by the term "ignition volume" and it is designated by the symbol "$V_i$." After the ignition event has occurred, the hot combustion products expand and force the piston towards its bottom-dead-center position, where the internal volume of the cylinder is $V_B$. As the piston approaches its bottom-dead-center position, the exhaust valve begins to open, marking the end of the power stroke and the beginning of another exhaust stroke.

The expansion ratio for the combustion products, designated herein by the symbol "η," is given by $$\eta = V_B (V_i)^{-1}$$

For the engine disclosed herein, $V_T$, the internal volume of the cylinder at the top-dead-center position of the piston, is very small in relation to either $V_i$ or $V_B$. $V_T$ may therefore be neglected in deriving a relationship between η and engine design variables Ω and $θ_i$. The derivation uses geometrical relationships that are evident from FIG. 1. The result is $$\eta = 2[1+\Omega-\cos θ_i - (\Omega^2 - \sin^2 θ_i)^{1/2}]^{-1}$$

Figure 2:
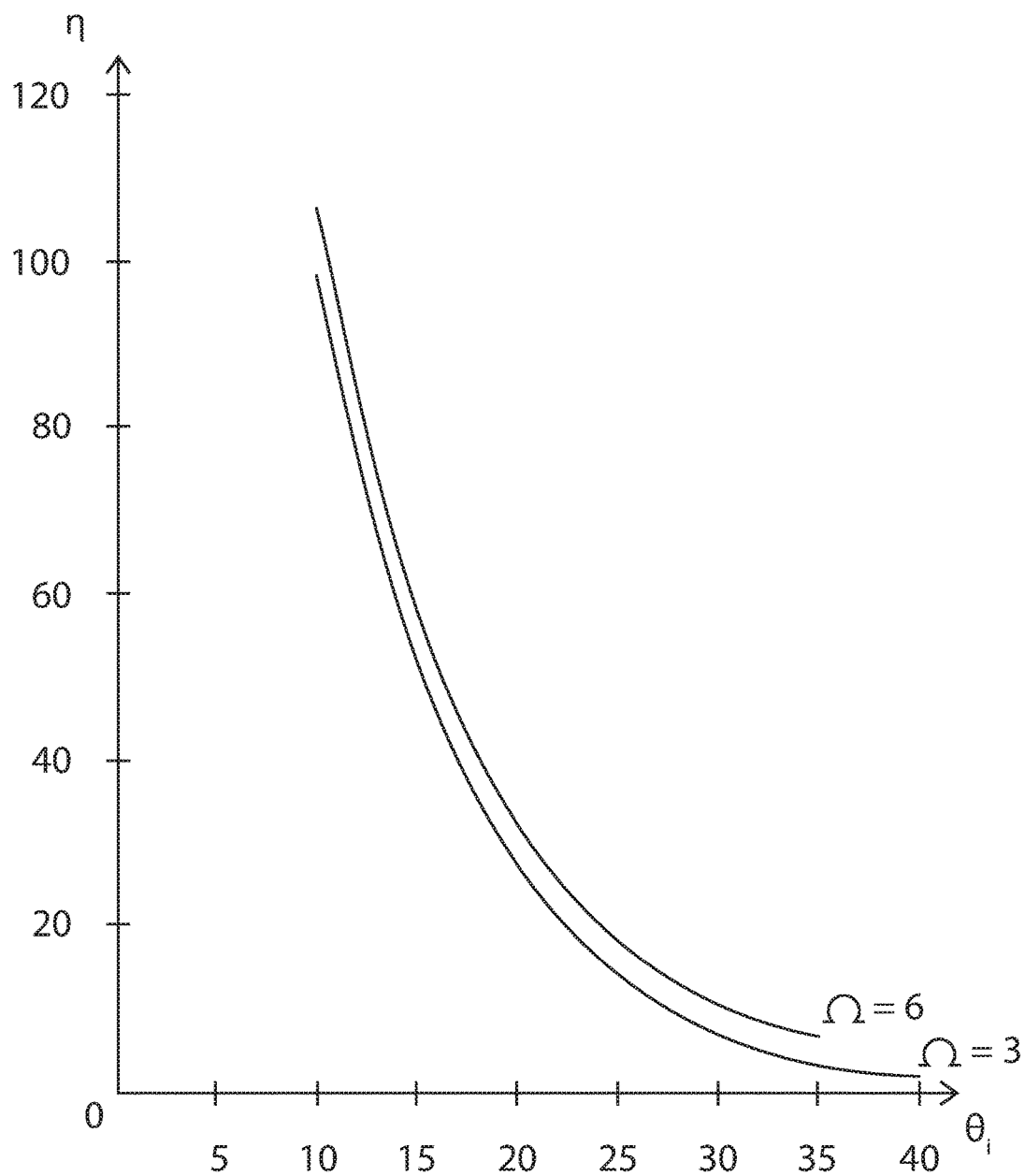
FIG. 2 is a plot, for the engine revealed herein, of expansion ratio of the combustion products as a function of crank ignition angle for two values of rod ratio.

FIG. 2 shows a plot of η versus $θ_i$ for two values of Ω. For a given value of $θ_i$, η increases as Ω increases. At small values of $θ_i$, η increases rapidly as $θ_i$ decreases. The plot shows that, once certain mechanical dimensions of the engine have been chosen, namely those dimensions which define Ω, it is possible to obtain a desired expansion ratio for the combustion products merely by choosing an appropriate value for $θ_i$. This is an extremely important design option that is only possible in engines of the type revealed herein, that is, in engines that do not utilize a compression process.

Figure 3:
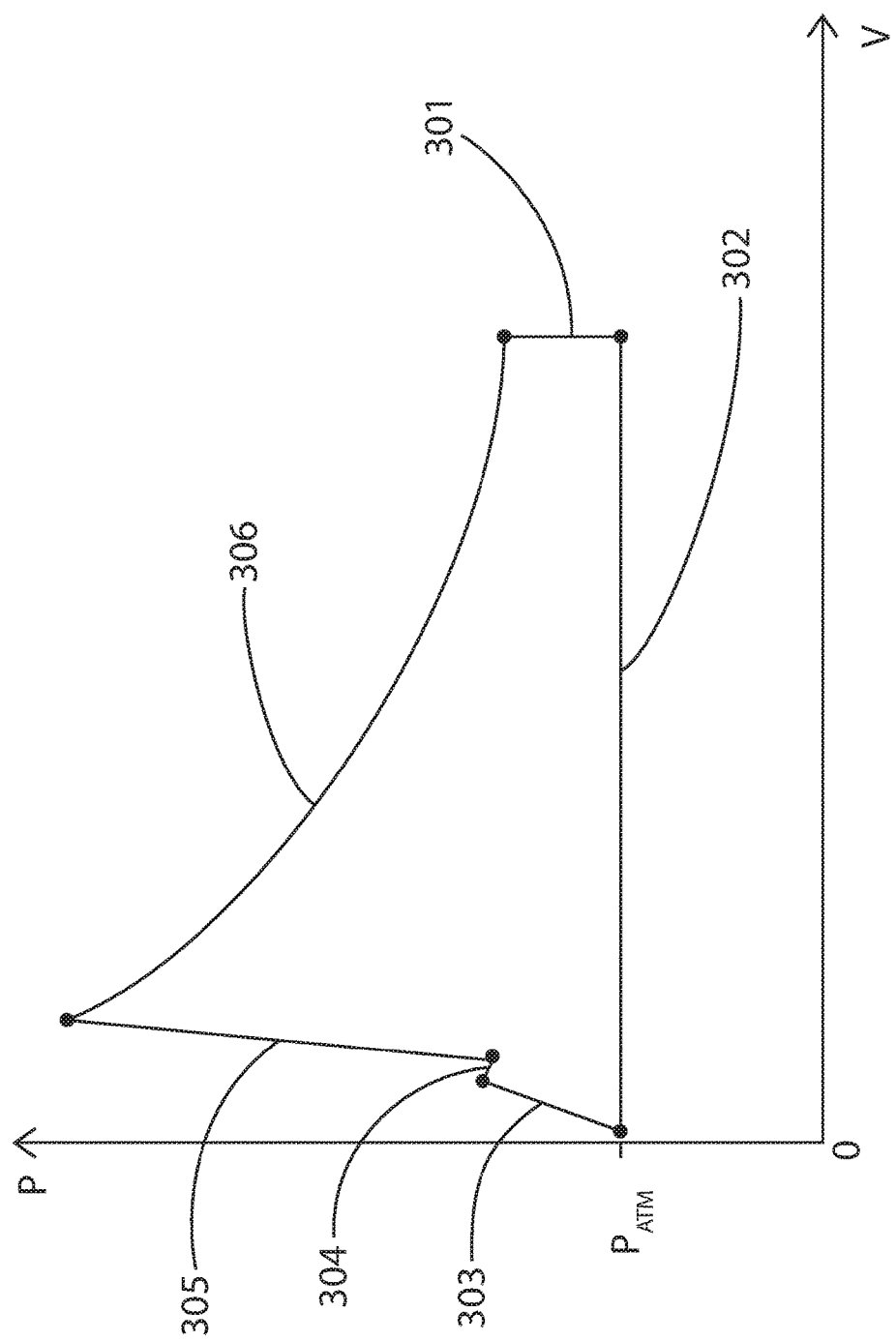
FIG. 3 shows the thermodynamic operating cycle of the engine revealed herein, with the operating cycle presented in terms of the pressure of gasses within a cylinder and the internal volume of the cylinder.

FIG. 3 shows the operating cycle of the presently revealed engine in terms of the pressure, P, of gasses within one of the engine's cylinders, and the internal volume, V, of that cylinder. Segment 301 of the cycle begins with the opening of the exhaust valve as the piston approaches its bottom-dead-center position. The segment represents a nearly isochoric process wherein the pressure of the combustion products drops to near one atmosphere. Isobaric segment 302 represents the exhaust stroke for the engine, wherein the piston moves from its bottom-dead-center position to its top-dead-center position. During this stroke, negligible internal work is done by the engine because the pressure inside the cylinder is approximately equal to atmospheric pressure. The mechanical design of the engine is such that the piston's top-dead-center position produces a vanishingly small internal volume of the cylinder, as is shown in FIG. 3. Segment 303 represents the expansion of fuel and oxidant gasses into the cylinder after the piston has passed its top-dead-center position. During this segment, the pressure in the cylinder rises, the internal volume of the cylinder increases, and useful work is done by the engine as the fuel and oxidant gasses expand against the piston. Segment 304 represents the brief period of time between the closing of the inlet valves and ignition of the fuel/oxidant mix. The pressure drops slightly during this segment as the internal volume of the cylinder continues to increase. Useful work is done by the engine during this segment as the high-pressure fuel and oxidant gasses continue to expand against the piston. Segment 305 begins when the fuel/oxidant gasses are ignited and it continues until the combustion process is complete. During this segment, the pressure and temperature of the gasses in the cylinder increase dramatically and the engine does useful work as the hot combustion products expand against the piston. Segment 306 begins when the combustion process is complete. During this segment, the pressure and temperature of the combustion products decrease as they undergo adiabatic expansion. The majority of the useful work done by the engine is done during this segment. Segment 306 ends as the piston approaches bottom-dead-center and the exhaust valve begins to open. The area enclosed by the six segments is representative of the useful work performed by the engine during one complete operating cycle.

Figure 4:
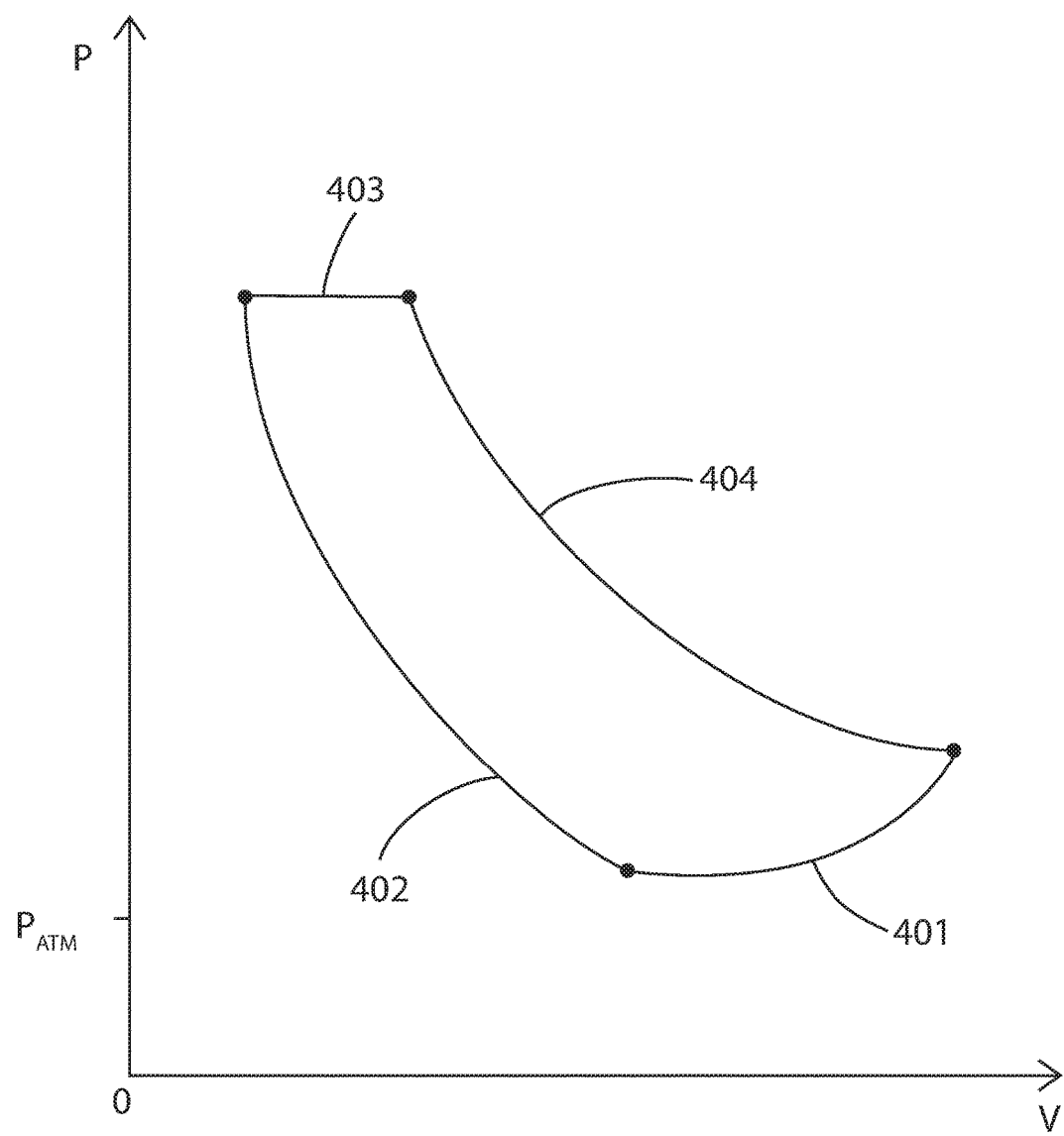
FIG. 4 shows the thermodynamic operating cycle typical of a two-stroke diesel engine, with the operating cycle presented in terms of the pressure of gasses within a cylinder and the internal volume of the cylinder.

FIG. 4 shows the operating cycle of a conventional two-stroke diesel engine, with the cycle again shown in terms of the pressure, P, of gasses in one of the engines cylinders, and the internal volume, V, of that cylinder. Segment 401, which begins as the piston approaches its bottom-dead-center position, shows the beginning of the piston's combined exhaust/compression stroke, when both the exhaust valve and an air inlet valve open. Pressure in the cylinder decreases slightly as high-pressure incoming air (supplied by a turbocharger or supercharger) forces combustion products out of the cylinder. After a pre-determined period of time, the exhaust and air inlet valves close. This marks the beginning of segment 402, wherein the pressure within the cylinder increases rapidly as the piston moves towards its top-dead-center position, compressing and heating the air trapped in the cylinder. It should be noted that, during this segment of the cycle, the engine does a considerable amount of internal work as the trapped air is compressed. The isobaric segment 403 in the diagram begins with the ignition of the diesel fuel and continues until combustion is complete. (In an ideal diesel engine, the fuel burns slowly and the internal pressure of the cylinder stays relatively constant as the fuel burns.) Segment 404 represents the post-combustion adiabatic expansion of the combustion products. Segment 404 is terminated by the opening of the exhaust and air inlet valves, which occurs as the piston approaches its bottom-dead-center position. The area enclosed by the four segments is representative of the net useful work done by the engine during one complete operating cycle.

It is clear from FIG. 3 and FIG. 4 that the engine revealed herein is capable of higher efficiency than its diesel counterpart because of the greater expansion ratio of the combustion products. In addition, the engine provides high torque because ignition of the fuel/oxidant gasses occurs well after the pistons have passed their respective top-dead-center positions. Also, the engine has a low overall operating temperature and low peak cylinder pressures because the fuel and oxidant gasses are relatively cool prior to their ignition. Finally, the engine has reduced noise and vibration levels because ignition of fuel/oxidant gasses occurs after the pistons have achieved non-zero velocities, that is, after they have moved away from their top-dead-center positions. The engine has these improved performance characteristics because (1) it does not utilize a compression process as part of its operating cycle, and (2) its exhaust stroke ends, and its power stroke begins, when the cylinder's internal volume is very close to zero. The engine does useful work during the pistons' power strokes by utilizing both the chemical energy of the fuel and the compression energy of the high-pressure fuel and oxidant gasses.

What is claimed is:

1. A two-stroke internal combustion engine comprising:
a) a multiplicity of hollow circular cylinders, with each of said cylinders having a central longitudinal axis, and with each of said cylinders having one closed end and one open end, and with each of said cylinders having, in its closed end, fuel and oxidant inlet valves and an exhaust valve, and with each of said valves being completely recessed relative to the inner surface of the closed end of said cylinder for open and closed configurations of said valves;
b) a multiplicity of moveable circular pistons, with each of said pistons being situated coaxially within one of said cylinders, and with each of said pistons being mechanically constrained to move in a reciprocating manner within the associated cylinder, and with the mechanical contour of the front surface of each of said pistons matching exactly the mechanical contour of the inner surface of the closed end of the associated cylinder;
c) a crankshaft, with said crankshaft having a central longitudinal axis which is intersected by, and is perpendicular to, the central longitudinal axes of said cylinders, and with said crankshaft being capable of rotational motion about its central longitudinal axis, and with said crankshaft having a multiplicity of crank arms, and with each of said crank arms being mechanically linked to one of said pistons by a connecting rod, and with the axial length of each of said pistons being such that for any set of engine operating conditions, when said piston is at its top-dead-center position, a small gap exists between the front surface of said piston and the inner surface of the closed end of the associated cylinder, and with the thickness of said gap being such that for any set of engine operating conditions, when said piston is at its top dead center position, the internal volume of the associated cylinder is less than 2 percent of the internal volume of said cylinder when said piston is at its bottom-dead-center position;
d) a control system, with said control system effecting a sequenced series of actions for each of said cylinders, with said series of actions comprising:

i) opening said cylinder's exhaust valve when said cylinder's associated piston reaches its bottom-dead-center position, thereby initiating said piston's exhaust stroke; and then ii) closing said cylinder's exhaust valve when said cylinder's associated piston reaches its top-dead-center position, thereby terminating said piston's exhaust stroke; and then iii) opening said cylinder's fuel and oxidant inlet valves at a time corresponding to the complete closure of said cylinder's exhaust valve, thereby initiating said piston's power stroke and enabling said cylinder to accept high pressure fuel and oxidant gases as said cylinder's internal volume is increasing; and then iv) closing said cylinder's fuel and oxidant inlet valves as soon as required load-specific quantities of fuel and oxidant have entered said cylinder; and then v) initiating the combustion of fuel and oxidant gases within said cylinder when said crankshaft reaches a specific, pre-determined crank angle; and then vi) opening said cylinder's exhaust valve when said cylinder's associated piston reaches its bottom-dead-center position, thereby terminating said piston's power stroke and initiating its next exhaust stroke.

2. An engine as described in claim 1 wherein, for each of said cylinders, said cylinder's exhaust valve remains open for the entire duration of the associated piston's exhaust stroke, thereby allowing gases within said cylinder to pass into an exhaust manifold for the entire duration of the associated piston's exhaust stroke.

3. An engine as described in claim 2 wherein each of said engine's cylinders accepts oxidant in the form of high-pressure oxygen gas and fuel in the form of high-pressure hydrogen gas while said cylinder's internal volume is increasing.

4. An engine as described in claim 2 wherein each of said engine's cylinders accepts oxidant in the form of high-pressure air and fuel in the form of high-pressure hydrogen gas while said cylinder's internal volume is increasing.

5. An engine as described in claim 2 wherein each of said engine's cylinders accepts oxidant in the form of high-pressure oxygen gas and fuel in the form of high-pressure natural gas while said cylinder's internal volume is increasing.

6. An engine as described in claim 2 wherein each of said engine's cylinders accepts oxidant in the form of high-pressure air and fuel in the form of high-pressure natural gas while said cylinder's internal volume is increasing.

7. An engine as described in claim 2 wherein each of said engine's cylinders accepts oxidant in the form of high-pressure oxygen gas and fuel in the form of ammonia vapor while said cylinder's internal volume is increasing.

8. An engine as described in claim 2 wherein each of said engine's cylinders accepts oxidant in the form of high-pressure air and fuel in the form of ammonia vapor while said cylinder's internal volume is increasing.

9. An engine as described in claim 2 wherein each of said engine's cylinders accepts a mixture of high-pressure gaseous oxidant and high-pressure gaseous fuel while said cylinder's internal volume is increasing.

10. An engine as described in claim 2 wherein said engine's exhaust manifold is maintained at sub-atmospheric pressure.

* * * * *